United States Patent Office                                                              3,206,030
                                                                                    Patented Sept. 14, 1965

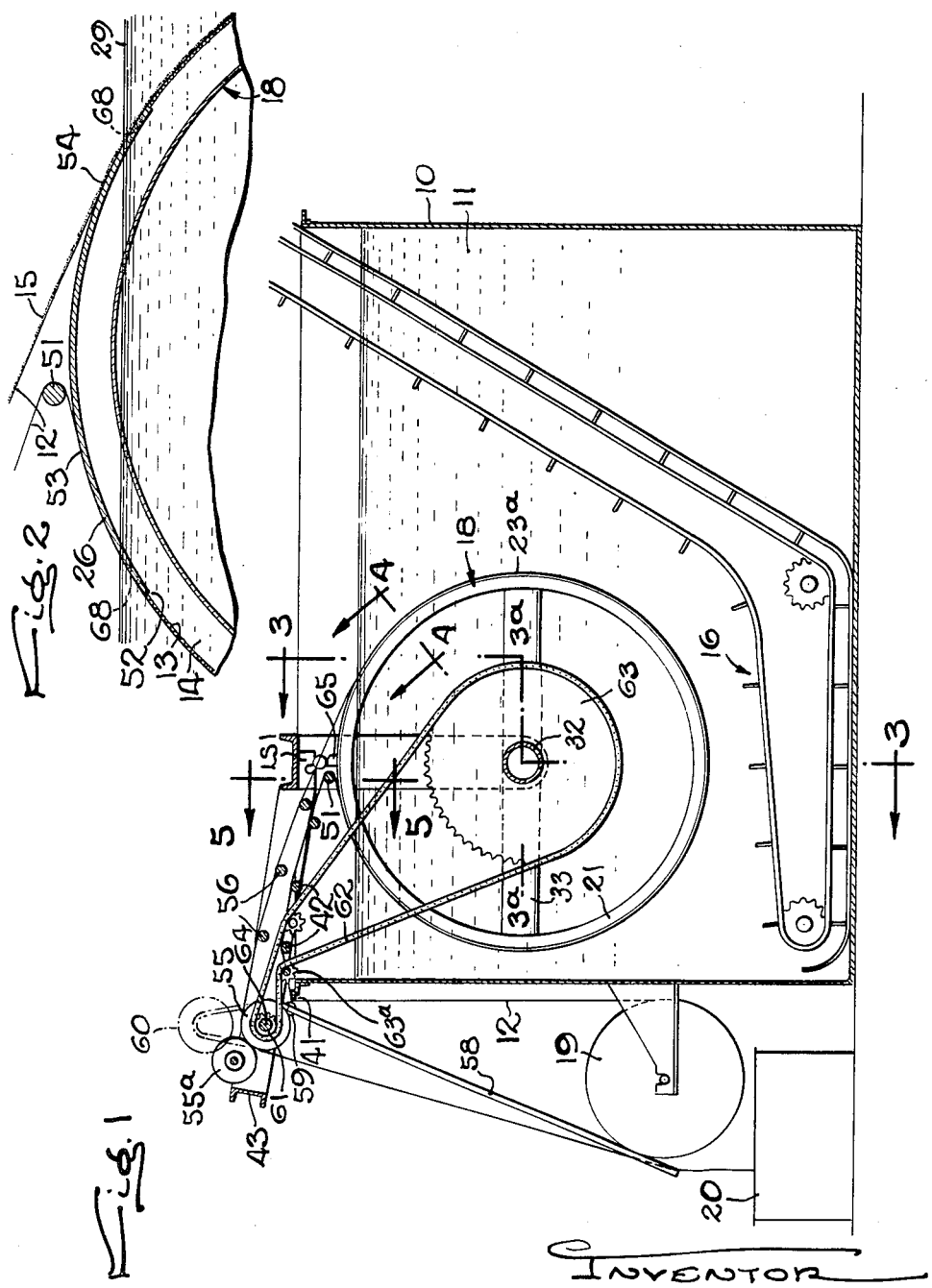

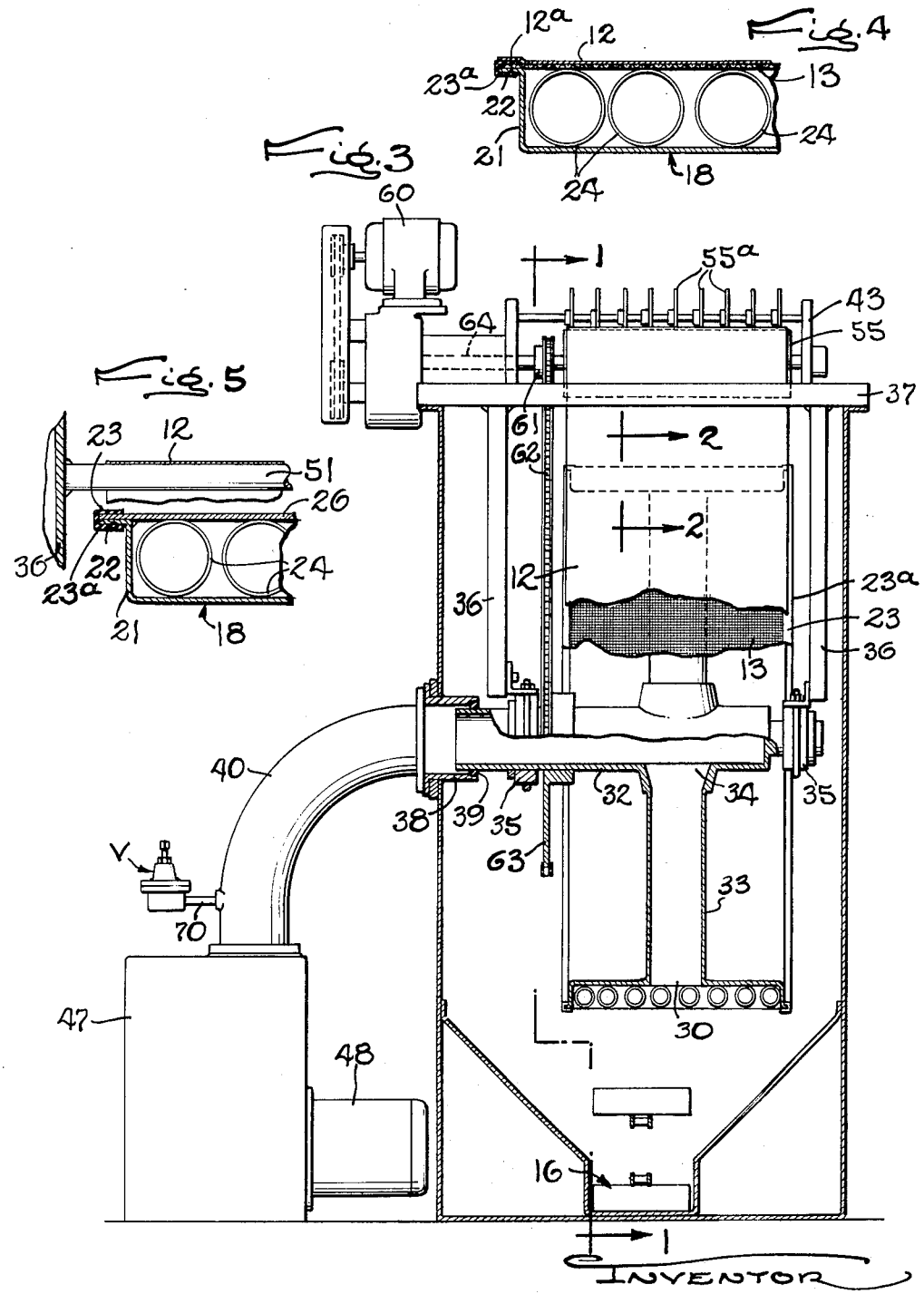

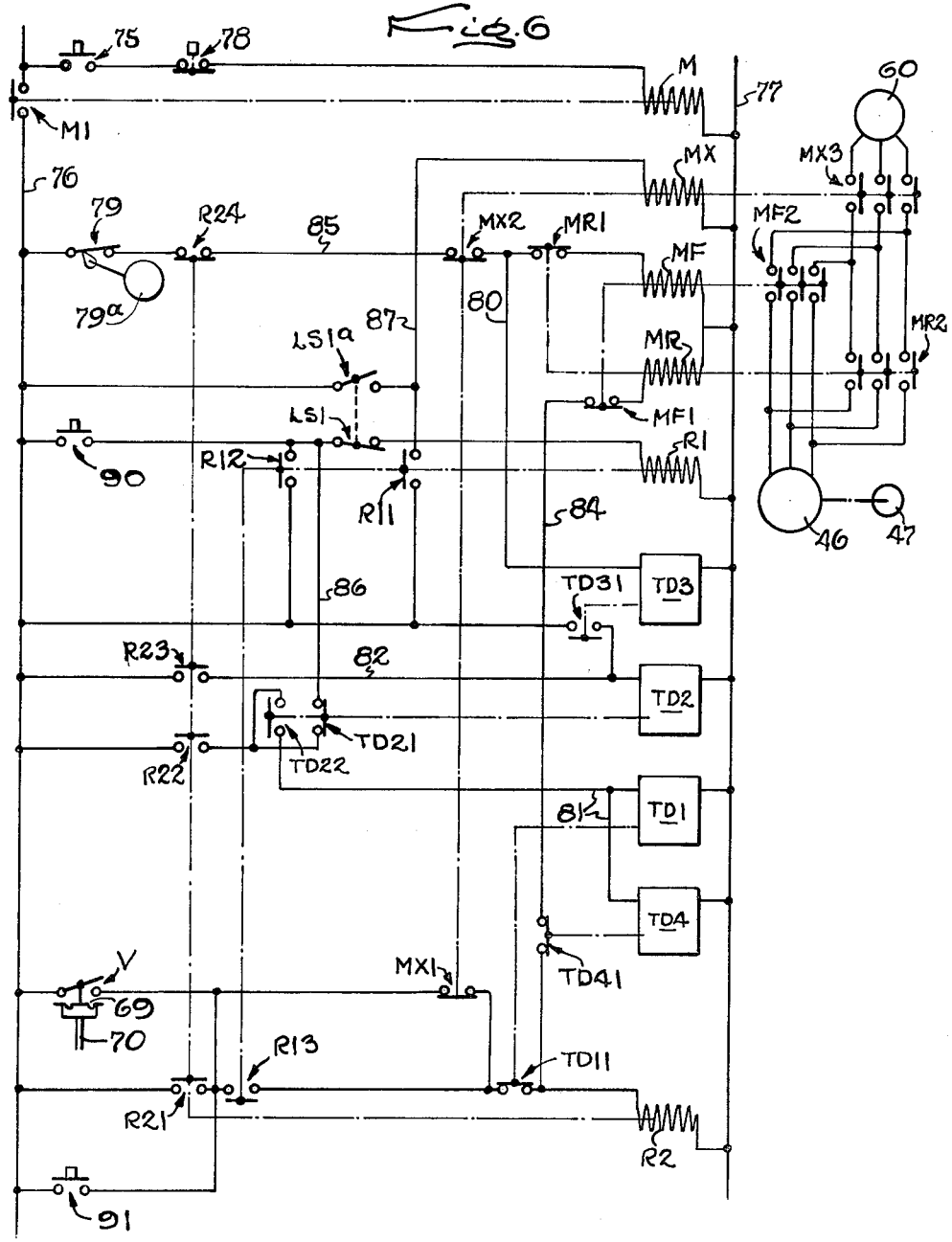

1

3,206,030
VACUUM FILTER
Mark R. Estabrook, Rockford, Ill., assignor to Barnes
Drill Co., Rockford, Ill., a corporation of Illinois
Filed Aug. 22, 1962, Ser. No. 218,581
7 Claims. (Cl. 210—97)

This invention relates to liquid filters of the so-called blow-back type in which, when the filter medium becomes clogged in service use, the filtering action is interrupted while the medium is being at least partially cleaned by reversing the flow of liquid therethrough to loosen and release the cake or filtered out solids and allow the same to settle to the bottom of the tank for removal by a conventional drag conveyor. In another of its aspects, the invention relates to a vacuum filter of the type in which a filter web extends around the submerged lower portion of a hollow member such as a drum rotatable about a horizontal axis to index a fresh length of the web into filtering position.

The general object is to provide a vacuum filter of the above character which, as compared to prior filters, is more economical to manufacture and operate and substantially smaller in over-all size for a given filtering capacity.

Another object is to provide in a filter of the above character a novel construction of the filter member which permits an arcuate portion thereof to be disposed above the liquid level during normal filtering action and extension of the filter medium into and out of contact with the drum at angularly spaced points above the liquid level.

A further object is to control the blow-down cycle in a novel manner such as to minimize the amount of solids drawn back to the drum upon resumption of the filtering action.

Another object is to control the indexing or replacement of the filter medium so as to carry a substantial part of the filtered out solids out of the tank by the filter medium itself.

The invention also resides in the novel manner of coupling the indexable filter chamber with the stationarily mounted pump for evacuating the filter chamber.

Other objects and advantages of the invention will become apparent from the following detailed description taken in connection with the accompanying drawings, in which FIGURE 1 is a fragmentary sectional view of the improved filter, the section being taken along the line 1—1 of FIG. 3.

FIG. 2 is a fragmentary section taken along the line 2—2 of FIG. 3.

FIG. 3 is a fragmentary sectional view taken along the line 3—3 of FIG. 1 with part of the filter drum shown as a section along the line 3a—3a of FIG. 1.

FIGS. 4 and 5 are sections taken respectively along the lines 4—4 and 5—5 of FIG. 1.

FIG. 6 is a schematic view and wiring diagram.

The improved blow-back type filter comprises generally an open tank 10 adapted to contain a body 11 of liquid to be filtered through an elongated strip or web 12 of a suitable filter medium covering the perforated wall 13 of a chamber 14 submerged in the liquid and subjected internally to a vacuum for inducing straining of the liquid through the web. Intermittently, the vacuum is dissipated and a positive pressure is produced in the chamber 14 to loosen and release the filtered out solids or cake 15 from the downwardly facing and downwardly inclined surface areas of the web. These solids gravitate downwardly in the tank and are caught by a suitable means such as a continuously operating conveyor 16 by which they are removed from the tank automatically while the next filtering cycle is progressing as a result of restoration of the vacuum in the chamber 14 shortly after release of the cake.

While the member supporting the filter web 12 may take various shapes, it is preferred, in order to facilitate replenishment of the web, to make the vacuum chamber 14 in the form of an annulus, the perforated wall 13 of the chamber being, in this instance, an arcuate screen forming the major portion of the outer periphery of a drum 18 and covered with a length of the web 12 drawn from a supply roll 19 and extended downwardly into the liquid 11. After passing around the drum screen, the web is led upwardly and out of the liquid and over suitable guides to a disposal receptacle 20 outside of the tank.

With the drum of such general construction, replenishment of all or part of the active length of filter web may by effected simply by indexing the drum about a horizontal axis. The present invention contemplates effecting such turning automatically with the circuitry shown in FIG. 6 when the web has, after a plurality of blow-back or cleaning cycles, become so clogged as to impair its filtering efficiency.

The inner and side walls of the vacuum chamber 14 are integral with each other and form a channel 21 having out-turned cylindrical flanges 22 encircled by and suitably secured to the margins of the screen 13. Herein, these flanges and the screen margins are straddled by strips 23ª of U-shaped section composed of yieldable material such as rubber so as to provide continuous outwardly facing cylindrical surfaces against which the margins 12ª of the web 12 become sealed under the applied vacuum. Intermediate its edges, the screen 13 is suitably backed as by coils 24 of wire helically wound and laid in and extending around the entire circumference of the channel 21.

In accordance with one aspect of the present invention, the screen or perforated area extends over the major part of the drum circumference while the remaining relatively short arc is imperforate and, in the filtering position of the drum, is exposed above the level 29 of the liquid in the tank. The imperforate area is formed by an arcuate plate 26 spanning the channel flanges 22 and welded or otherwise sealed to the flange surfaces. Opposite ends of the plate abut the ends of the screen as shown in FIG. 2 and the outer surface is substantially flush with the screen surface.

The filter web may be composed of various materials, paper having a high wet strength and composed of nonwoven fibers of cotton, rayon, nylon, or resin treated cellulose being preferred. It is wide enough to cover all of the holes in the screen 13 and overlap the seal surfaces 23 along the edges of the screen.

The channel forming the filter drum is apertured as indicated at 30 (FIG. 3) and welded or otherwise secured to the outer ends of radially extending pipes 33 whose inner ends are welded to opposite sides of an elongated tube 32 around holes 34 therein. Opposite end portions of the tube project through and are journaled in bearings 35 at the lower ends of bars 36 rigidly suspended from a bar 37 which extends across and is secured rigidly to the upper edge of the tank. One end of the drum shaft 32 is closed while the other end telescopes within a tubular fitting 38 extending through and clamped to a side wall of the tank. A suitable ring 39 between the telescoped parts provides a pressure seal permitting rotation of the drum while its hollow shaft communicates continuously with a pipe 40 coupled to the outer end of the fitting 38 and leading to the inlet of a pump 47 driven by a reversible electric motor 48.

While running in one direction, the pump withdraws filtered liquid out of the chamber 14 through the pipe 40 creating in the chamber a vacuum whose magnitude at any time is determined by the prevailing condition of the filter web 12, that is, the extent of clogging of its pores or the density and thickness of the filter cake 15 which has accumulated therein. Preferably, the pump is of the positive displacement type such as a so-called Moyno type manufactured by Robbins & Myers. Such a pump is adapted to operate in either direction of rotation of its shaft, a characteristic which is utilized in the present invention by making the motor 48 reversible.

To enable the active length of the filter web covering the screen 13 to be replaced simply by turning of the drum, a dry and unused length unwound from the supply roll 19 is led upwardly and over the edge 41 of the tank and then horizontally over crossbars 42 spanning opposite sides of a rectangular frame 43, the inner end of which is formed by the bar 37. The frame thus supported cantilever fashion is inclined upwardly and overhangs the edge of the tank. Inwardly beyond the crossbars, the web is inclined downwardly to and extends reversely around a rod 51 spanning and welded at opposite ends to the bars 36 of the drum frame as shown in FIG. 5. The rod is spaced a short distance above the liquid level 29 and is disposed between a vertical diameter of the drum and the end 52 of the imperforate plate 26, the position of the rod being such that the web 12 is led into contact with the imperforate area of the drum at a line 53 which is always disposed above the liquid level. Beyond this line, the web lies in full contact and covers the remaining outer end portion of the plate 26.

Beyond this plate, the web extends downwardly around the screen 13 and upwardly and over the submerged other end portion of the plate. The web is led out of the liquid along a tangent which is so located that the final line 54 of contact with the drum is on the plate and, like the point 52, is always disposed above the top of the liquid. For this purpose, the wet length of the web above the liquid is pulled by a rotary roll 55 upwardly along suitable guide bars 56 spanning the sides of the frame 43 and spaced a short distance above the bars 42. The bars 56 are so located as to maintain the desired final line 54 of contact with the plate when the web is held taut by the counterclockwise turning of the roll 55 against the top when the web is pressed under the weight of idler wheels 55a. Beyond the roll, the wet web carrying the filtered out solids 15 is delivered onto an imperforate chute 58 which is inclined downwardly and outwardly above and beyond the supply roll 19. The inclination of the chute is sufficient to induce the web to slide down freely and off the end of the chute into a disposal receptacle 20. By pivoting the chute at 59 and allowing its outer end to rest on the roll 19, a friction drag is exerted on the roll 19 thus maintaining the web under the proper tension all the way to the drum.

After repeated blow-back cycles later to be described, the web may become clogged to such a degree as to prevent further filtering at the desired efficiency. A new length of the web is brought into filtering position by turning the drum through one revolution. While this may be accomplished by hand, the turning is preferably by an electric motor 60 mounted on the frame 43 and operating through suitable reduction gearing to drive a pinion 61 meshing with a chain 62 which extends around idler sprockets 63a and a sprocket 63 fixed to the drum shaft 32. The shaft 64 of the roll 55 is extended into the gear case and driven at a speed such as to turn the roll counterclockwise with a peripheral speed slightly greater than that of the drum 18 thus maintaining the wet web between the drum and the roll taut at all times. This is accomplished by properly sizing the pinion 61 and the sprocket relative to the respective outside diameters of the roll and drum.

Through a limit switch LS1 mounted on the drum frame and actuated by an arm 65 fixed to the channel 21, the drum may be turned through one full revolution or indexing cycle, thus replacing the full length of the filter web while leaving the imperforate area 27 of the drum surface at the top of the drum and centered horizontally above the drum axis. In this filtering position of the imperforate area, opposite ends of the vacuum chamber will be sealed properly when the vacuum is restored in the chamber and the web is drawn against the ends of the screen. If desired, the effectiveness of the seal between the paper and the submerged portions of the imperforate area 27 may be increased by providing a few holes 68 (FIG. 2) through these portions so as to utilize the vacuum within the chamber 14 to draw the web against these areas.

It will be observed that the web is led off from the drum and out of the liquid in a plane tangent to the drum at the line 54 and is conveyed with the dirty side facing upwardly all the way to the chute 58. The on-coming or fresh web is also led onto the drum along a tangent to the drum at the line 52, this being made possible by bending the web reversely around the rod 51. With this arrangement and the contact lines 53 and 54 disposed above the liquid level 29 in the filtering position of the drum, it will be apparent that during clockwise indexing of the drum, the plate 26 becomes covered by a length of the web and therefore is never exposed directly to the dirty liquid while it is submerged during the indexing. Also, the web engages and leaves the seal surfaces 23 along the lines 52 and 54 and below the surface 29 of the liquid. This eliminates any possibility of solids from the dirty liquid becoming trapped between the web and the plate or the seal surfaces so as to separate the web and the submerged end portions of the plate when the drum is returned to the filtering position. As a result, the effectiveness of the seals formed at these submerged portions of the plate and the surfaces 23 is preserved effectually after each indexing cycle.

*Normal filtering cycle.*—With the drum positioned as shown in FIG. 3, the pump 47 withdraws filtered liquid out of the chamber 14 at a fixed rate thus creating a vacuum which increases progressively with the increase in the thickness of the filter cake 15. The filtering efficiency of the web corresponds to this vacuum thus making it desirable to interrupt the filtering from time to time and clean or rejuvenate the length of filter web then supported by the drum.

*Blow-back cycle.*—Such intermittent interruption of the filtering is accomplished by stopping the pump and then forcing filtered liquid reversely through the pipes 40 long enough to build up a positive pressure in the chamber 14 and force some liquid outwardly through the web but insufficient to separate the latter from the drum 18 and destroy the seals at the web margins when the vacuum is again restored. In this way, the cake 15 is loosened sufficiently to induce a substantial part thereof to gravitate downwardly and away from the filter drum for eventual removal from the tank by the conveyor.

While the filtering may be interrupted and a blow-back cycle initiated in accordance with a prearranged schedule, it is preferred to sense the substantial impairment in the filtering efficiency of the web by measuring the vacuum in the chamber 14. Herein, the attainment of such a vacuum is sensed by a switch V (FIGS. 3 and 6) actuated by a diaphragm 69 which, through a tube 70, is exposed on one side to the pressure in the pipe 40 and therefore in the chamber 14. The reverse flow of the filtrate may be interrupted to end the blow-back cycle by the action of a timer TD4 (FIG. 6) after which operation of the pump is resumed to continue the filtering.

The reverse flow or blow-back of the filtrate into the vacuum chamber may be effected simply by reversing the pump 47, this being possible by virtue of the positive displacement character of the pump. In view of the substantial capacity of the pump, experience has shown that the filter cake may be released in the desired manner by reverse turning of the pump impeller for a relatively short interval.

In another aspect, the invention contemplates delaying and restarting the pump after a blow-back for an interval sufficient to enable the released solids to settle away from the filter web so far that they will not be drawn back against the web when the vacuum in the chamber is again restored. This delay interval is measured by a timer TD1 which is set to time out in a period longer than that of the timer TD4 by an interval equal to the settling period desired.

*Indexing cycle.*—During prolonged filtering which may be interrupted by several blow-back cycles, the pores of the paper web may become so clogged with fine solids that the filtering efficiency is reduced to an objectionable degree. Such a condition is detected by building up of the vacuum within the chamber 14 and actuation of the switch V in a predetermined interval measured by a timer T21 and shorter than the period required during normal filtering for the pressure switch to be actuated. This timer is energized with the resumption of filtering following each blow-back cycle and its expiration is evidenced by opening of a switch TD21 and closure of a switch TD22.

A cycle for indexing the drum to renew the filter web is executed in response to the detection of such clogging of the web. But, as a preliminary to this, the vacuum within the chamber 14 is released to permit easy stripping of the web paper off from the perforated surface 13 of the drum 18 during the indexing while preventing building up of enough pressure in the chamber 14 to release the accumulated solids from the web. As a result, the solids are retained on the filter web during the indexing cycle and thus carried by the web upwardly and out of the liquid as illustrated in FIG. 2 and finally discharged into the disposal receptacle. Much of the fine solids are thus removed and need not be filtered out again in later filtering cycles. As will appear later, the indexing cycle is terminated by closure of a limit switch LS1a by the arm 65 when the drum completes a full revolution.

OPERATION

With the circuitry shown in FIG. 6, filtering and blow-back cycles are executed alternately and interrupted intermittently by the execution of an indexing cycle to replenish the web on the drum when the filtering efficiency of the web becomes impaired. The several timing devices TD shown diagrammatically in FIG. 6 are of the type in which the device is reset by a spring upon deenerigzation of a motor driving a cam which, after the lapse of an adjustable and preselected time interval operates to change the condition of one or more switches. Such timers are manufactured by Eagle Signal Company and sold under the trade name of Microflex.

*Starting the filter.*—Assume that the motors 48 and 60 are stopped, all relays are deenergized, the various switches are positioned as shown in FIG. 6, the drum 18 covered with fresh paper is at rest, the timers TD1–4 are set for example to time out in intervals of 15 seconds, 4 minutes, .5 of a second and 10 seconds, respectively, and the tank is filled with dirty liquid up to the level 29 as shown in FIG. 3, only a part of the imperforate area 27 of the drum being exposed above the liquid. The filtering action is initiated by closing a start switch 75 to energize a relay M through a normally closed stop switch 78 and thereby close a switch M1 which connects the power source to the line 76. If the liquid in the tank is up to the normal level 29, a switch 79 will be closed by a float 79a to energize a relay MF through a circuit 85 to the other terminal 77 including a switch R24 of a relay R2, a then closed switch MX2 of the index motor control relay MX and a switch MR1 of the relay MR which controls the reverse operation of the pump motor 46. The relay MF closes switches MF2 for starting the pump motor 46 in the forward direction. At the same time, a parallel branch circuit 80 is closed energizing the timer TD3 which, after a selected interval, for example, a half second, times out closing its switch TD31. This energizes the timer TD2 with its switch TD22 open and switch TD21 closed, the timer being set to time out and reverse the switches upon expiration of the desired normal filtering interval, for example four minutes.

In the initial operation of the pump, filtered liquid is pumped out of the chamber 14 through the pipes 32 and 40 thus building up a vacuum in the chamber to accelerate the filtering action. The pump is adjusted to withdraw the filtered liquid at the desired rate and build up a predetermined vacuum, for example 15 inches of mercury in the chamber. The vacuum best suited for any installation is determined by numerous factors including the fineness and character of the material 15 to filtered out of the liquid, the purity desired in the filter liquid, etc.

*Blow-back to clean filter web.*—Normally, the first filtering cycle will continue until the vacuum attains the value for which the vacuum switch V becomes closed which, in view of the fresh condition of the filter web, will occur after expiration of the interval for which the timer TD2 is set and the latter has timed out to close the switch TD22 and open the switch TD21. After timing out, TD2 is held energized by the TD31 since T3 remains energized. Closure of the switch V thus energizes a relay R2 through the then closed switches MX1 and TD11, the relay being sealed by closure of its switch R21. Closure of the switch R22 completes circuits 81 through the then closed switch TD22 to energize the timers TD1 and TD4. Opening of the switch R24 interrupts the circuit 80 for deenergizing the timer TD3 to permit resetting thereof to open the switch TD31 but the timer TD2 remains energized through a circuit 82 including switch R23.

Opening of R24 interrupts the circuit for the relay MF thus opening the switches MF2 to deenergize the pump motor 46. The closure of the switch MF1 when the relay is deenergized completes a circuit 84 through TD41, TD11, MX1 and R21 energizing the relay MR to close the switches MR2 and start the motor in the reverse direction thus pumping filtered liquid through pipes 40 and 32 and into the chamber 14. After dissipation of the vacuum, a positive pressure is developed in the chamber thus releasing the filter cake 15 which is accelerated by the flow of some liquid outwardly through the pores of the paper. Such reverse operation of the pump continues for a few seconds or until the timer TD4 times out thus opening TD41 to break the circuit 84, deenergizing MR and stop the motor pump. This ends the blow-back cycle.

*Settling away of the released solids.*—In the restarting of the filtering action to allow the released solids to move to move or settle away from the paper web 12, restarting of the pump is delayed by setting the timer TD1 to time out a few seconds after the time TD4 has stopped the pump. When this interval expires, the switch TD11 is opened thus deenergizing the relay R2 which opens its switches R21, R22 and R23 to deenergize and permit resetting of the timers TD1 and TD4. At the same time, R24 is reclosed thus completing the circuit 85 to energize MF and start the motor and pump in the forward direction to resume pumping of liquid out of the drum and the rebuilding of a vacuum in the chamber 14 to continue the filtering action.

In order to allow sufficient time for the complete resetting of the timer TD2 between opening of the switch R23 and the closing of the switch R24, the timer TD3 is energized and set to time out .5 of a second later and reenergize the timer TD2.

*Indexing to renew the filter web.*—Another filtering cycle is then executed followed by a blow-back cycle which cycles are repeated as above described until, by the accumulation of fine solids, the paper web becomes so clogged that the vacuum switch V becomes closed in a filtering cycle before the timer TD2 times out. With the switch TD21 thus closed, energization of the relay R2 in response to closure of the vacuum switch V opens its switch R24 and the circuit 85 thus deenergizing the relay MF and the pump motor 46.

As a result of closure of the switch MF1, the relay MR is energized to initiate reverse operation of the pump motor 47 long enough to dissipate the vacuum in chamber 14. The initial circuit for MR extends through MF1, TD41, TD11, MX1 and the vacuum switch V.

Also in response to energization of the relay R2 and closure of its switch R22, a circuit 86 is completed through TD21 and LS1 to energize a relay R1 which is sealed through LS1 by closure of its switch R12 and closes a switch R13 for maintaining the circuit 84 closed and reverse operation of the pump through the switch R21. Closure of the relay switch R11 completes a circuit 87 for energizing a relay MX for closing the switches MX3 to energize the motor 60 and initiate indexing of the drum. The pump is started in a direction to reverse the flow of filtered liquid and force the same into the chamber 14 to dissipate the vacuum therein and facilitate stripping of the wet web off from the drum in the remainder of the indexing motion.

As the drum leaves the normal filtering position, the switch LS1a is closed to complete a holding circuit for maintaining energization of MX and the indexing motor. Shortly thereafter, the switch LS1 is opened thus interrupting the circuit 86 and deenergizing the relay R1 which opens its switch R13 thus deenergizing MR and interrupting the operation of the pump while the indexing cycle continues. It will be apparent that the duration of reverse operation of the pump 47 to dissipate the vacuum within the filter chamber 14 may be controlled by varying the time spacing of the closure of the switch LS1a and opening of the switch LS1.

After completion of a complete revolution of the drum to replace the dirty filter web by a length of fresh paper, the switch LS1 is closed and LS1a is opened to deenergize the relay MX and stop the indexing motor. This is accompanied by reclosure of the switch MR1 thus completing the circuit 85 for reenergizing the relay MF to restart the pump and initiate resumption of the filtering action.

If during the operation of the filter as above described, it is desired to execute an indexing cycle of the filter drum, it is only necessary to manually close a switch 90. This completes the circuit 86 to energize the relay R1 and close the switch R11 so as to energize MX and the motor 60.

Similarly, by manual closure of a switch 91, regular blow-back cycle for cleaning the filter web then covering the drum is executed. This switch it will be observed is in parallel with the vacuum switch V by which successive blow-back cycles are initiated in normal automatic operation of the filter.

I claim as my invention:

1. A vacuum filter having, in combination, a tank adapted to contain a body of liquid to be filtered maintained at a predetermined level, a hollow rigid drum defining an annular chamber having imperforate inner and side walls and a cylindrical outer peripheral wall defined by a perforated area occupying the major circumference thereof, another arc of the drum circumference being imperforate, means supporting said drum in said liquid for indexing about a fixed horizontal axis coincident with the axis of the drum and in a normal filtering position with said perforated area and the end portions of said imperforate area submerged while leaving the intermediate portion of the imperforate area exposed above said liquid level, an endwise movable web of flexible filter medium extending downwardly into and out of said liquid and into and out of contact with said imperforate area at points disposed above said level, said web extending around said peripheral wall and covering all of said perforated area and opposite end portions of said imperforate area, means for evacuating said chamber to induce straining of the liquid through said medium and said perforated area, means for sensing clogging of said medium by the filtered out solids, and mechanism for indexing said drum to remove the clogged web and draw a new length thereof onto said peripheral wall and stopping the drum in said filtering position with the intermediate portion thereof exposed above said liquid level.

2. A vacuum filter as defined in claim 1 in which said indexing mechanism turns said drum through one revolution.

3. A vacuum filter having, in combination, a tank adapted to contain a body of liquid to be filtered maintained at a predetermined level, a hollow member defining an elongated chamber having imperforate inner and side walls and an endless peripheral wall the major length of which is perforated and a remaining arcuate length is imperforate, endless seal surfaces at opposite side margins of the perforated area and continuously around the periphery of said member, means supporting said member in said liquid for indexing about a fixed horizontal axis coincident with the center of curvature of said imperforate arcuate wall and stopping the member in a normal filtering position with said perforated area and the ends of said imperforate area submerged and the intermediate portion of the imperforate area exposed above said liquid level, an endwise movable web of flexible filter medium extending downwardly into and out of said liquid and contact with said imperforate area at points disposed above said level, said web extending around said peripheral wall and covering all of said perforated area, said seal surfaces, and opposite end portions of said imperforate area, means for evacuating said chamber to induce straining of the liquid through said medium and said perforated area, and means for sensing clogging of said medium by the filtered out solids and indexing said member about said axis in response to such clogging to remove the clogged web and draw a new length thereof onto said peripheral wall and terminate the indexing when the member has been return to said filtering position.

4. A vacuum filter as defined in claim 3 in which, during said indexing of said drum, the said filter web is led off from the drum and out of the liquid along an upwardly inclined plane and the clean portion of the web is extended downwardly toward the drum and then reversely around a roller disposed adjacent the drum periphery.

5. A vacuum filter as defined in claim 3 in which the ends of said perforated area when the drum is in said filtering position are spaced far enough below said liquid level to prevent the formation of a vortex in the liquid above such ends while said chamber is evacuated.

6. A vacuum filter having, in combination, a tank adapted to contain a body of liquid to be filtered maintained at a substantially constant level, a hollow member movably mounted in said tank and providing a chamber defined in part by a perforated wall submerged in said liquid in the normal filtering position of the member, an elongated endwise movable web of a filter medium extending downwardly into said liquid, along said wall to cover the perforations therein and then upwardly and out of the liquid, means for indexing said member and moving said web endwise to remove the web from said perforated wall and bring a fresh length of the web onto the wall, a conduit communicating with said chamber, a power driven pump operable to withdrawn filtered liquid out of said conduit and said chamber and build up a vacuum in the latter for inducing the filtering of a liquid inwardly through said web and said perforated wall to build up a layer of filtered out solids on the outer surface of the web, mechanism operable after a period of filtering through said web to initiate a blow-back cycle including interrupting the withdrawal of liquid from said chamber by said pump, reversal of the flow of liquid in said conduit until said solids have been released from the web, and then resumption of the withdrawal of the liquid from the conduit and filtering through said web, and means for sensing clogging of said web by said solids and controlling said mechanism and said indexing means to dissipate the vacuum in said chamber while retaining the filtered out solids on said web, then index said member to cover said wall with a new length of said web and finally resume operation of said pump and the withdrawal of liquid from said chamber.

7. A vacuum filter as defined in claim 6 in which said blow-back cycle and the dissipation of the vacuum preparatory to indexing said member are effected by reversing the operation of said pump for different lengths of time.

References Cited by the Examiner

UNITED STATES PATENTS

| | | | |
|---|---|---|---|
| 775,475 | 11/04 | Pape | 210—401 |
| 2,280,930 | 4/42 | Reeves | 210—416 X |
| 2,332,917 | 10/43 | Jordan et al. | 210—411 |
| 2,494,534 | 1/50 | Armstrong et al. | 210—108 X |
| 2,713,022 | 7/55 | Dole et al. | 210—401 X |
| 2,752,045 | 6/56 | Hornbostel | 210—387 X |
| 2,823,806 | 2/58 | Harlan | 210—387 |
| 2,887,228 | 5/59 | Harlan et al. | 210—108 |
| 2,969,148 | 1/61 | Hirs | 210—387 X |
| 3,091,336 | 5/63 | Hirs | 210—387 |

REUBEN FRIEDMAN, *Primary Examiner.*

HERBERT L. MARTIN, *Examiner.*